(12) United States Patent
Eguchi

(10) Patent No.: US 6,219,150 B1
(45) Date of Patent: Apr. 17, 2001

(54) COMMUNICATIONS TERMINAL DEVICE HAVING ELECTRONIC MAIL FUNCTION

(75) Inventor: Masashi Eguchi, Kyoto (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 0 days.

(21) Appl. No.: 09/078,331

(22) Filed: May 13, 1998

(30) Foreign Application Priority Data

May 20, 1997 (JP) .................................................. 9-130167

(51) Int. Cl.[7] ...................................................... G06F 15/16
(52) U.S. Cl. ........................ 358/1.15; 358/1.14; 709/232
(58) Field of Search .................. 358/1.15, 1.14, 358/402, 403, 407, 442, 443, 468; 709/200, 204, 206, 207, 230, 231, 232, 236, 233, 234; 379/93.01, 100.01, 100.17; 340/825.44

(56) References Cited

U.S. PATENT DOCUMENTS

| 5,166,932 | | 11/1992 | Hoff et al. | |
| 5,363,090 | * | 11/1994 | Cannon et al. | 340/825.44 |
| 5,479,411 | * | 12/1995 | Klein | 379/88.13 |
| 5,548,789 | * | 8/1996 | Nakanura | 709/206 |
| 5,559,721 | * | 9/1996 | Ishii | 709/206 |
| 5,754,778 | * | 5/1998 | Shoujima | 709/206 |
| 5,784,000 | * | 7/1998 | Sato | 340/825.44 |
| 5,805,810 | * | 9/1998 | Maxwell | 709/206 |
| 5,991,514 | * | 11/1999 | Nielsen | 358/1.14 |
| 6,088,131 | * | 7/2000 | Imai et al. | 358/450 |
| 6,101,548 | * | 8/2000 | Okada | 709/236 |

FOREIGN PATENT DOCUMENTS

| 07297972 | 11/1995 | (JP) | H04N/1/00 |
| 09102858 | 4/1997 | (JP) | H04N/1/32 |
| WO 97/10668 | 3/1997 | (WO) | H04N/1/00 |

* cited by examiner

Primary Examiner—Edward Coles
Assistant Examiner—Joseph R. Pokrzywa
(74) Attorney, Agent, or Firm—Hogan & Hartson, LLP.

(57) ABSTRACT

A communications terminal device having an electronic mail function and capable of reproducing a single original image even if it receives a plurality of electronic mails. When a remote facsimile machine divides an original image presented on one page of document into smaller pieces before transmission and sends them to the communications terminal device in the form of plurality of electronic mails, the communications terminal device determines whether or not a received electronic mail is one of those mails. If so, the plurality of image are synthesized to a single image and printed on one sheet of recording paper.

2 Claims, 4 Drawing Sheets

COMMUNICATIONS TERMINAL DEVICE HAVING ELECTRONIC MAIL FUNCTION

BACKGROUND OF THE INVENTION

1. TECHNICAL FIELD

The present invention relates to a communications terminal device having an electronic mail function, and more particularly to such a communications terminal device equipped with a function of receiving electronic mails of which a message is composed of image data and a function of outputting these images on recording sheets.

2. BACKGROUND ART

A large (or maybe global) computer communications network delivers electronic mails via an internet etc. in which smaller or local computer communications networks are connected to each other via communications lines, and such a large computer communications network has been lately spread. The computer communications networks are excellent in error correction functions. In addition, by only bearing communications expenses required until the nearest provider (a connection dealer for the computer communications network), a user can communicate with not only terminals in Japan but also overseas computers.

As a communications algorithm and a communication system of a conventional G3 facsimile device differ from those of the computer communications network, the conventional facsimile device cannot directly be connected to the computer communications network. However, it becomes feasible if the data is converted to an electronic mail form. Even image data can be transmitted through the computer communications network as long as it has an electronic mail form.

In order to access the internet, a user may contract with a provider or utilize a connection service provided by commercial BBS for personal computer communications. Some of the commercial BBS connection services have limitations on the volume of data to be transmitted as one mail, such as the number of data and the number of lines of text data. This is because line congestion would occur if a great quantity of data were allowed to flow in the internet at one time.

In the case of facsimile image data transmission which generally requires transmission of great quantity of data, the amount of data on one page of document to be transmitted may exceed the one mail limitation. The commercial BBS connection service refuses mail delivery if the mail contains data exceeding the predetermined amount. In such a case, the facsimile device cannot transmit image data to a desired destination by means of electronic mail.

Then, the image data having such a great quantity may be divided into a plurality of pieces of smaller data and a plurality of mails may correspondingly be transmitted in order to cancel the above mentioned inconveniences.

One way of dividing image data on one page of original document into a plurality of smaller pieces of image data and transmitting them to a destination in the form of a plurality of electronic mails via a single communications channel is disclosed in Japanese Patent Application No. 9-130170 filed May 20, 1997 in Japan and in a corresponding U.S. patent application Ser. No. 09/078,345 filed May 13, 1998 claiming priority of this Japanese application, both owned by the present assignee and the entire disclosures thereof are incorporated herein by reference.

However, when a plurality of electronic mails are transmitted via the internet, it is not promised that all the electronic mails are transferred to a destination via a specified route of the internet. Accordingly, a communications terminal device on the reception side may not receive a plurality of mails in due order of transmission and some of the mails may delay from others. There is another possibility that some of the mails may even disappear midways and may not arrive.

Further, the communications terminal device on the receiving side cannot determine whether the received mail is one of the mails corresponding to one of the plurality of pieces of single image data divided on the sending side before transmission or a mail transmitted without dividing (each mail corresponding to one page of original document). The receiving communications terminal device cannot also determine which mails have not arrived yet and whether there are any missing mails or not.

Moreover, if the communications terminal device on the receiving side prints the received electronic mails on different sheets of recording paper but each of these electronic mails is one of a plurality of mails which should be combined to a single image data, each of the printed images only shows a part of the original image. In this case, it should be said that information transmission is incomplete and insufficient.

Japanese Patent Application, Laid-Open Publication No. 8-314821 discloses a communications method employed when a single file is divided into a plurality of segments before transmission. These file segments are transmitted to a destination via a plurality of communications channels respectively, and are combined to a single file on the receiving side. This method, however, requires a plurality of communications channels. In addition, this does not teach how to identify an undelivered segment (undelivered mail).

Japanese Patent Application, Laid-Open Publication No. 8-317167 discloses a facsimile communications system and method for reporting a communications error to a data sending machine if the total number of pages received is without a predetermined range. However, this does not teach how to determine which page is not undelivered.

SUMMARY OF THE INVENTION

A first object of the present invention is to provide a communications terminal device having an electronic mail function which is capable of receiving a plurality of electronic mails via a single communications channel, synthesizing a plurality of segmented image data delivered by the plurality of electronic mails to single and complete image data and printing a collective single image on a single recording sheet for perfect reproduction of an original image based on the synthesized image data when a remote communications terminal device divides an original image presented on one page of document into a plurality of pieces of image and transmits them in the form of plurality of electronic mails.

Another object of the present invention is to provide a communications terminal device having an electronic mail function which is particularly advantageous in image data management when the communications terminal device receives a plurality of electronic mails and each of the mails corresponds to one page of original document. The communications terminal device of the invention detects missing electronic mails and outputs data relating to these mails (which pages of original document are missing). In addition, when the communications terminal device receives the missing electronic mails later, it outputs data indicating that the just arrived data are the missing mails. Otherwise, the already received mails would then be declared as missing mails. Furthermore, the information about the missing mails is printed after printing of all the delivered electronic mails so that a user on the receiving side can easily handle the plurality of image data received.

According to the first aspect of the present invention, there is provided a communications terminal device having an electronic mail function and capable of receiving an electronic mail of image data from a remote facsimile machine via a single communications channel and outputting (printing) an image, comprising: first determination means for determining whether a received electronic mail is one of a plurality of electronic mails which are prepared by a remote communication machine by dividing an original image presented on one page of document into a plurality of smaller pieces (blocks) of image before transmission to the communications terminal device or the received electronic mail is an electronic mail corresponding to one page of original document; first output means for synthesizing image data of the plurality of electronic mails to a collective single image and outputting the collective single image on one sheet of recording paper if the first determination means determines that the received electronic mail is one of a plurality of electronic mails which corresponds to one of the smaller pieces of image; and second output means for converting the image data of the single electronic mail to a single image and outputting the single image on one sheet of recording paper if the first determination means determines that the received electronic mail corresponds to one page of original document.

The communications terminal device of the present invention refers to particular data contained in, for example, management or control information of the electronic mails which relates to dividing of the original image (manuscript) such as job number, total page, page number, total block number and block number. Then, the communications terminal device determines whether or not the received electronic mails correspond to the pieces of the original image data. If it is determined that the original image on one page of original document is divided into smaller pieces (blocks) on the sending side before transmission, the communications terminal device combines these pieces of data and prints a single image on a recording sheet. Therefore, even if the original image data has a greater volume than a prescribed one-mail limitation of a particular intermediate connection service company and it is divided into smaller pieces before transmission, the communications terminal device on the receiving side can reproduce the original image appropriately.

If the original image on one page of document is within the prescribed volume set by an intermediate connection service company, the one page of document can be transmitted in the form of one electronic mail, i.e., dividing the original image is unnecessary. Then, a plurality of pages are transmitted by a plurality of electronic mails respectively. If the original image is not divided and one electronic mail corresponds to one page of original document, then the synthesizing means is not caused to operate and the communications terminal device simply prints image data of the electronic mail on a single recording sheet.

The communications terminal device may further include second determination means for determining whether or not all the electronic mails corresponding to the pieces of the original image on one page of original document have arrived and prohibition means for prohibiting printing of the image if any one of the electronic mails has not arrived. Therefore, outputting an incomplete image can be avoided and a user will not be bothered or confused by such insufficient information. The image which does not contain sufficient information is not output.

The communications terminal device may further include third determination means for determining which page of original document is transmitted in the form of electronic mail just received, fourth determination means for identifying missing mails if any based upon determination made by the third determination means, and third printing means for outputting data relating to the missing mails. Undelivered electronic mails among these mails are detected and data about the undelivered mails is output. Therefore, image data management or handling is facilitated.

The communications terminal device may further include storage means for storing data about which page of the original documents corresponds to the missing electronic mail, and fourth printing means for outputting data indicating that the electronic mail just received is the missing electronic mail if the missing electronic mail arrives later.

The missing mails have been identified by the fourth determination means. The storage means then memorizes the data about the missing mails in such a manner to show which missing mails correspond to which pages of the original documents. When the missing mails are transmitted later, a certain message or sign may be printed in a header or footer on each of recording sheets on which these delayed mails are printed in the form of image. Such inconvenience is therefore avoided that the already arrived electronic mails are determined to be missing electronic mails.

The third printing means may print the data about the missing electronic mails after the last page of the arrived electronic mails. By outputting the data relating to the missing electronic mails following printing of the images of the successfully received mails, a user on the receiving side can easily know which pages are now in his or her hand and which pages are not.

BRIEF DESCRIPTION OF THE ACCOMPANYING DRAWINGS

DETAILED DESCRIPTION OF THE PREFERRED EMBODIMENTS

A facsimile device is taken as an example of a communications terminal device according to the present invention and the description will be made. It is to be noted that an internet is used as a computer communications network to carry an electronic mail in the this particular embodiment.

Figure 1:
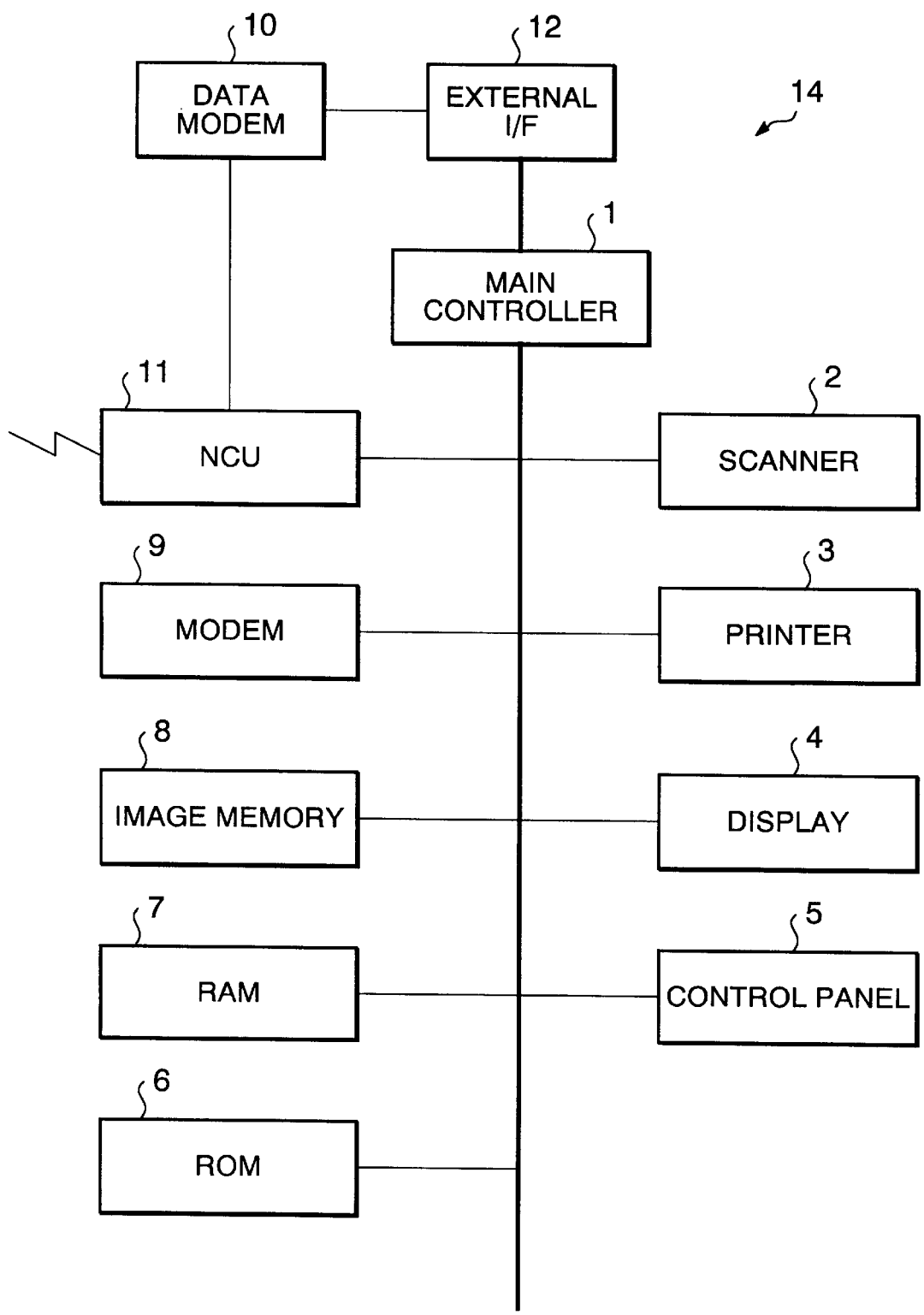
FIG. 1 illustrates a block diagram of a facsimile device having an electronic mail function according to the present invention.

Referring to FIG. 1, a main control section 1 not only controls each section of hardware of a facsimile device 14 through a bus, but also executes software for communications procedures such as those for coding and decoding image data of manuscripts by coding methods (e.g., MH, MR, MMR), image (TIFF) conversion (will be described later), binary text conversion, mail editing, modem switching, and controlling RS232C by AT commands on the basis of the software stored in ROM 6.

The main control unit 1 also executes software for synthesizing a plurality of incoming image data carried by a plurality of electronic mails to a single image data and printing a single image on one sheet of recording paper if a remote communications terminal device divides an original image presented on one sheet of document into smaller pieces or blocks before transmission. However, the main control section 1 does not print until all the mails arrive (will be described later in detail).

The main control unit 1 refers to header information of each of the received electronic mails to determine whether or not each of the electronic mails corresponds to an original image presented on one page of a plurality of documents (i.e., whether or not the original image on one page of document is transmitted without being divided). The main control unit 1 also identifies missing electronic mails if any, and outputs data relating to the missing electronic mails (which page of original image corresponds to which missing electronic mail). This data is also stored in RAM 7. When the missing electronic mails arrive later, the main control unit 1 refers to the data stored in RAM 7 so that it does not declare that the already received electronic mails are now missing.

In image conversion, the remote facsimile machine converts image data of G3 format into TIFF (Tagged Image File Format) which is an image format used generally in a computer at the time of transmission, and the facsimile device 14 of the invention converts the TIFF image data into G3 format at the time of reception. The TIFF is disclosed by Adobe Systems, Inc. and defines various classes for handling not only two values of white and black, but also a plurality of values of white and black, a full color etc. CLASS F which is one of these classes defines image data of G3 form which is image data of manuscript coded in accordance with a coding method such as MH, MR or MMR. Accordingly, by adding TIFF header information of CLASS F at heading of image data of G3 form, it is possible to convert the G3 image data into the TIFF.

In binary text conversion, the remote facsimile machine converts binary data into text data at the time of transmission, and the facsimile device 14 converts text data into binary data at the time of reception. It should be noted here that the internet is possibly accessed by computers which cannot handle electronic mails of binary data. If binary data such as TIFF image data is transmitted, the binary data is once converted into text data so as to accurately deliver an electronic mail to a destination. The text data handled in the internet is prescribed as a 7-bit code in RFC (Request for Comments) 822 or 1341 which is a document issued by IETF (Internet Engineering Task Force).

Then, conversion is made by utilizing "base 64" of MIME (Multipurpose Internet Mail Extensions). According to this, 6-bit binary data is replaced with one of 64 characters (alphabets of large characters and small characters, numbers, +and /) and can be converted into text data. MIME is prescribed by RFC.

In mail editing, the remote facsimile machine adds mail header information to TIFF image data, which is already converted into text data, to edit it to an electronic mail form at the time of transmission, and the facsimile device 14 eliminates the mail header information from the data of electronic mail form to only extract the TIFF image data having text data format at the time of reception. As it is prescribed as management information for an electronic mail that predetermined header information is added to an electronic mail delivered through the internet, items such as "From: (user's Internet e-mail address)", "To: (destination's internet e-mail address)", "Subject: (title)" and the like are added to heading of the TIFF image data at the time of transmission.

Figure 2:
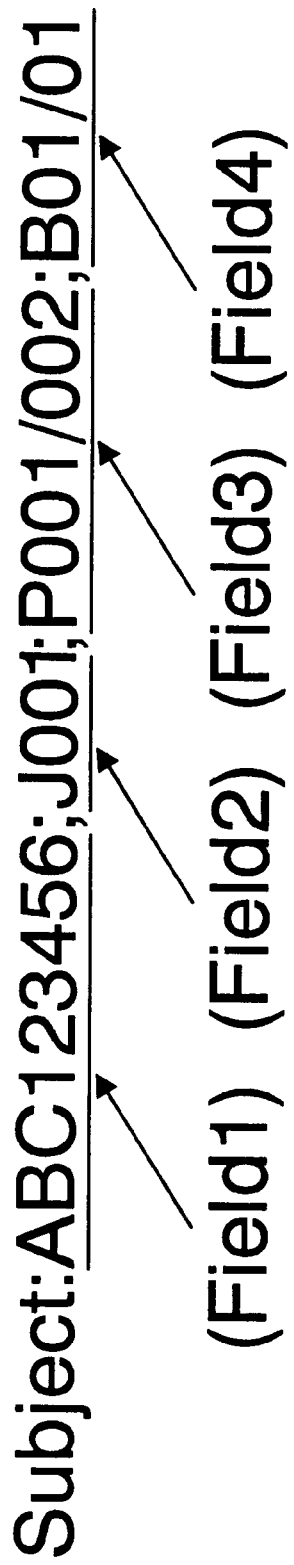
FIG. 2 illustrates contents of header information and the format.

FIG. 2 illustrates an example of the header information and its format.

In this example, information relating to dividing of the original image presented on one page of document and received in the form of a plurality of electronic mails is indicated in the "Subject" field of the header information and the facsimile machine 14 on the reception side interprets this field.

The "Subject" field consists of four subfields partitioned by ";". Information of a sender such as log-in ID is included in the first subfield (Field 1), a job number for identifying a mail to be handled as a single reception file is included in the second subfield (Field 2) (one electronic mail corresponding to one sheet of original document), a page number (XXX) and total number of pages (YYY) are included in the third subfield (Field 3) with the format of PXXX/YYY, and a block number (XX) and a total number of blocks (YY) are included in the fourth subfield (Field 4) with the format of BXX/YY (each block corresponding to one piece of an original image presented on one page of document). If the fourth subfield is "B01/01", it means that the original image on one page of document is not divided before transmission.

Referring back to FIG. 1, a scanner (or image reader) 2 includes CCD or the like to read an original document and outputs binary (black and white) image data of the original document.

A recording unit 3 includes a printer of electrophotographic type and records (prints) image data delivered from a remote G3 facsimile device or internet.

A display 4 includes a liquid crystal display unit etc. and displays an operation state of the facsimile device 14 or the image data received.

A control panel 5 includes various keys needed for operating the facsimile device 14 such as a ten-key, a quick dialing key, a one-touch dialing key and other function keys.

ROM 6 stores software for the operations of the facsimile device 14.

RAM 7 includes an SRAM, a flash memory or the like, and stores temporarily data generated upon execution of the software. For example, if an original image on one page of document is divided to a plurality of smaller pieces by the remote facsimile machine and transmitted to the facsimile device 14 in the form of a plurality of electronic mails or if a plurality of pages of original document are transmitted in a plurality of mails respectively but there is an undelivered electronic mail, a total number of the electronic mails transmitted, page numbers of the electronic mails received, page numbers of the electronic mails undelivered etc. are stored in RAM 7 for a predetermined period.

An image memory 8 includes a DRAM etc. and stores the image data received from a remote communication machine.

A modem 9 is provided for sending facsimile image data to a remote facsimile machine, which image data is scanned by, for instance, the scanner 2. The modem 9 is not equipped with a data communications function in this embodiment.

A data modem 10 is provided for data communications with a remote communications terminal in which, for example, image data of an original document converted into an electronic mail is sent to or received from the remote communications terminal via the internet. The data modem 10 is connected to, for example, an external telephone terminal provided in a chip of NCU 11 through a telephone cable. The data mode 10 is also connected to a serial port of an external I/F 12 by RS232C for connection with a personal computer etc.

NCU 11 connects or disconnects an analog circuit.

It should be noted that the data modem 10 may be dispensed with and the modem 9 may have both a function of a data modem and a function of a facsimile modem.

Figure 3:
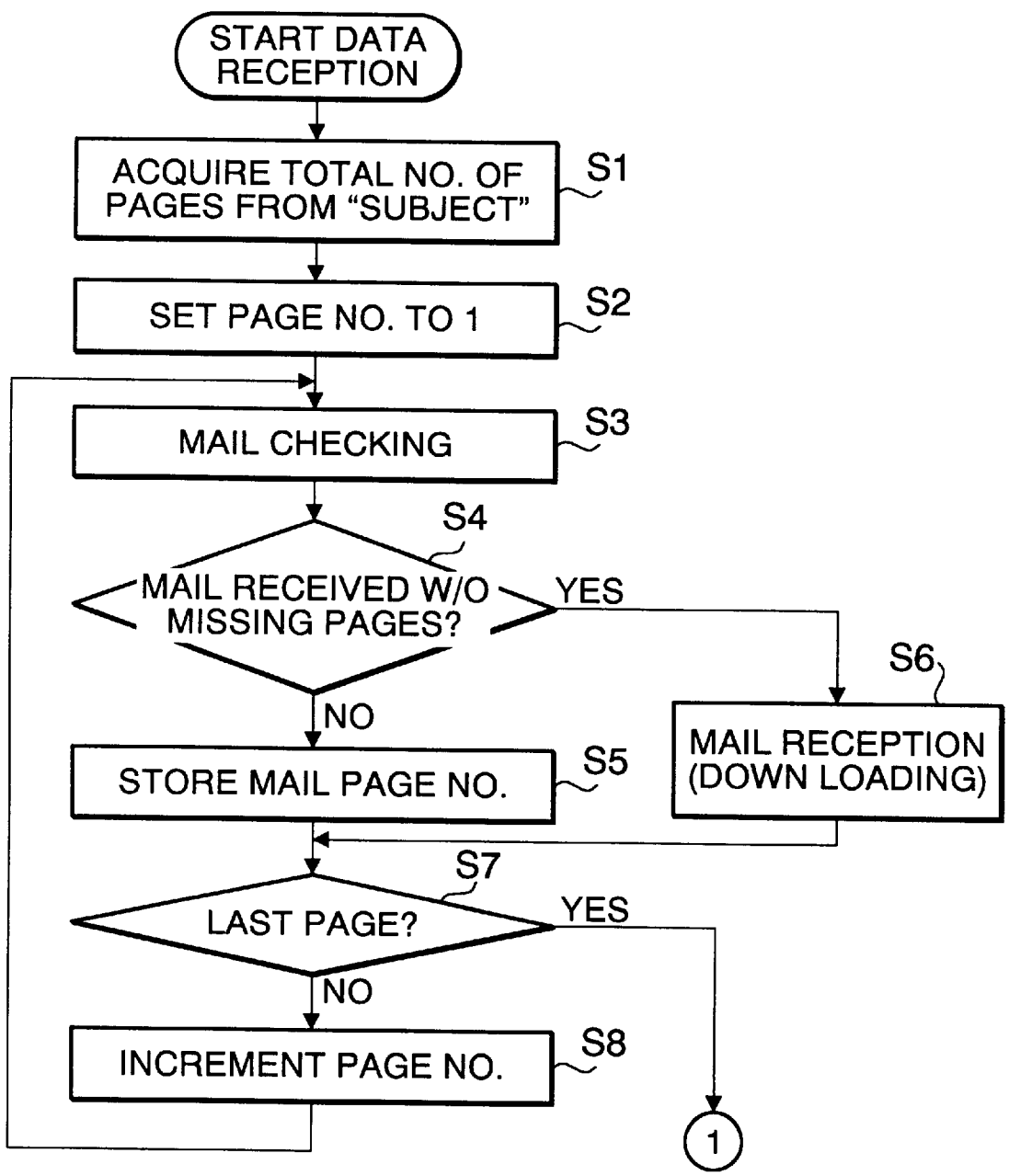
FIG. 3 is a half of the flowchart depicting a series of operations executed by the facsimile device of the present invention shown in FIG. 1.
Figure 4:
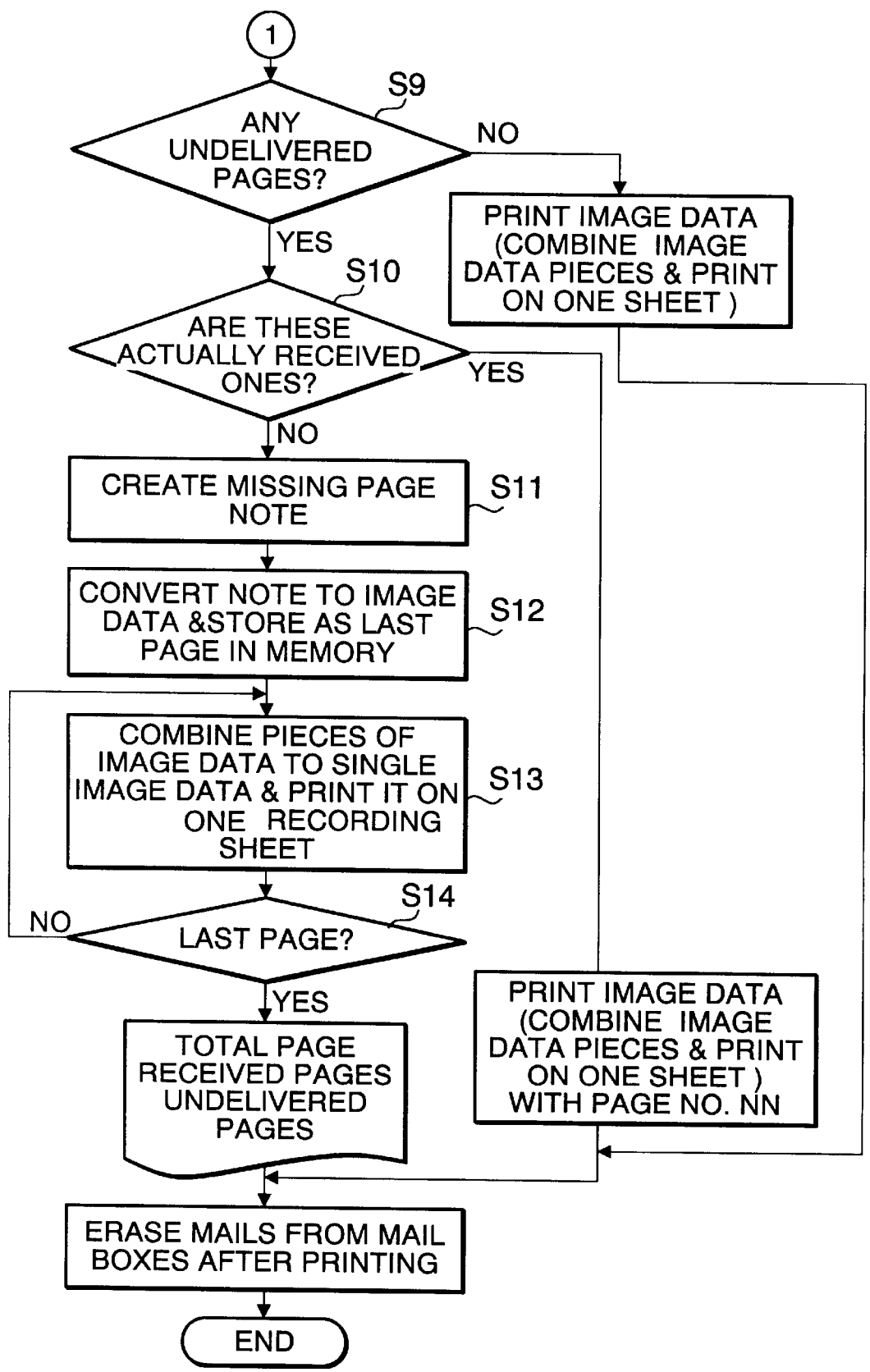
FIG. 4 is another half of the flowchart.

Next, the operations of the facsimile device 14 of the present invention will be described with reference to the flowchart of FIGS. 3 and 4. A single flowchart is separately illustrated in these drawings.

The total number of pages is acquired from the "Subject" field in the header information of the electronic mail received first in a mailbox of a provider (step S1), and a value of a register provided in RAM 7 in for counting and storing a page number is set to "1" (step S2).

If a remote communication terminal device (not shown) sends a plurality of electronic mails which correspond to a plurality of original documents respectively and these electronic mails are stored in mailboxes, the facsimile machine 14 on the receiving side refers to "Subject" fields of the mails to check page numbers.

If a remote communications terminal device divides an original image presented on one page of document into a plurality of smaller pieces, sends them in the form of a plurality of electronic mails to the facsimile machine 14 and the first mail is stored in a mailbox, the controller 1 of the facsimile machine 14 notices that this is the first one of such mails by referring to the "Subject" field of this mail.

In the mail checking steps of S3 and S4, the controller 1 refers to the "Subject" fields of all the mails received and stored in the mail boxes and determines whether or not all the mails are successfully received. For example, if the first and third mails are found, then the second mail is determined to be missing.

If some mail boxes are found to be empty (i.e., if some electronic mails are missing) and other mail boxes are occupied by appropriate mails, the page numbers of the received mails are stored in RAM 7 as undelivered pages (step S5). Therefore, if the answer at step S4 is NO, the received mails in the mailboxes are declared as missing mails until all of the electronic mails are received. Although declared as missing mails, these mails are downloaded and printed if the mails correspond to a plurality of original documents. If the mails correspond to a plurality of smaller pieces of data obtained by dividing a single original document, the mails are not downloaded until all of the mails are received in mailboxes. If all the mails arrive at the mail boxes, the mails are downloaded to the facsimile machine 14 from the mail boxes (step S6).

Next, it is decided whether or not the page number stored in the register is a final page number by referring to the total number of pages indicated in the "Subject" field (step S7). If NO, the page number in the register increments (step S8). Then, steps S3 to S7 are repeated until the final page.

When the processes of steps S3 to S7 are repeated until the final page (YES at step S7), it is determined whether or not there are any undelivered pages (step S9). If YES, it is determined whether or not these pages are those which have been received in the mailboxes and downloaded already for printing by referring to the RAM 7 (step S10). If these pages are already downloaded and printed on the receiving side, electronic mails which are received just recently by the mailboxes are printed by the printer 3. These printed pages came late so that a particular indication such as "Late Coming Mail Page No. NN" is appended to the top or bottom of each page. After downloading and printing, the contents in the mailboxes are erased.

If the answer at step S10 is NO (i.e., some of the undelivered pages are really missing mails), a page slip-out notice containing the total number of pages, the page number received, the page number undelivered etc. is prepared (step S11).

The slip-out notice is converted into image data and is accumulated in the image memory 8 as a next page of the final page of the received mails (step S12).

The image data accumulated in the image memory 8 are printed such that a plurality of image data are combined to a single image if an original image presented on one sheet of document has been divided into smaller blocks before transmission (step S13). If the above algorithm is repeated until the final page (step S14), the image of the slip-out notice is printed following the final page of the received image data.

On the other hand, if all the mails are successfully received (NO at step S9), the process is completed upon outputting of the image on a recording sheet from the printer 3 based on the image data carried with the electronic mails received, and erasing of the contents of the mailboxes.

What is claimed is:

1. A communications terminal device having an electronic mail function for receiving electronic mails of image data from a remote communication machine via a single communications channel and outputting images, comprising:

first determination means for determining whether a received electronic mail is one of a plurality of electronic mails which are prepared by a remote communication machine by dividing an original image presented on one page of document into a plurality of smaller pieces of image before transmission to the communications terminal device or the received electronic mail is an electronic mail corresponding to one page of original document;

first output means for synthesizing image data of the plurality of electronic mails to a collective single image and outputting the collective single image on one sheet of recording paper if the first determination means determines that the received electronic mail is one of a plurality of electronic mails which corresponds to one of the smaller pieces of image;

second output means for converting the image data of the single electronic mail to a single image and outputting the single image on one sheet of recording paper if the first determination means determines that the received electronic mail corresponds to one page of original document, second determination means for determining to which page of document the electronic mail just received corresponds if a plurality of electronic mails each corresponding to one pare of original document have been received;

third determination means for identifying an undelivered electronic mail among the plurality of electronic mails if any based upon determination made by the second determination means; and third output means for outputting data relating to the undelivered electronic mail based on identification made by the third determination means, wherein said data relating to the undelivered electronic mail includes a total number of pages and page number undelivered.

2. A communications terminal device having an electronic mail function for receiving electronic mails of image data from a remote communication machine via a single communications channel and outputting images, comprising;

first determination means for determining whether a received electronic mail is one of a plurality of electronic mails which are prepared by a remote communication machine by dividing an original image presented on one page of document into a plurality of smaller pieces of image before transmission to the communications terminal device or the received electronic mail is an electronic mail corresponding to one page of original document;

first output means for synthesizing image data of the plurality of electronic mails to a collective single image and outputting the collective single image on one sheet of recording paper if the first determination means determines that the received electronic mail is one of a plurality of electronic mails which corresponds to one of the smaller pieces of image, wherein the first output means include:
second determination means for determining whether or not all of the plurality of electronic mails corresponding to a plurality of smaller pieces of image have arrived at the communications terminal device; and prohibition means for prohibiting outputting of the image if the second determination means determines that all of the plurality of electronic mails have not arrived;

second output means for converting the image data of the single electronic mail to a single image and outputting the single image on one sheet of recording paper if the first determination means determines that the received electronic mail corresponds to one page of original documents, third determination means for determining to which page of document the electronic mail lust received corresponds if a plurality of electronic mails each corresponding to one page of original document have been received;

fourth determination means for identifying an undelivered electronic mail among the plurality of electronic mails if any based upon determination made by the third determination means; and third output means for outputting data relating to the undelivered electronic mail based on identification made by the fourth determination means, wherein said data relating to the undelivered electronic mail includes a total number of pages and page number undelivered.

\* \* \* \* \*